C. Vander Woerd,
Hose Coupling
N° 20,532.  Patented June 8, 1858.

UNITED STATES PATENT OFFICE.

CHS. VANDER WOERD, OF CAMBRIDGE, MASSACHUSETTS, ASSIGNOR TO ALVAN CLARK & SONS, OF SAME PLACE.

HOSE-COUPLING.

Specification of Letters Patent No. 20,532, dated June 8, 1858.

*To all whom it may concern:*

Be it known that I, CHARLES VANDER WOERD, of Cambridge, in the county of Middlesex and State of Massachusetts, have invented a new and Improved Hose-Coupling; and I do hereby declare that the following is a full, clear, and exact description of the same, reference being had to the accompanying drawings, making a part of this specification, in which—

Figure 1:
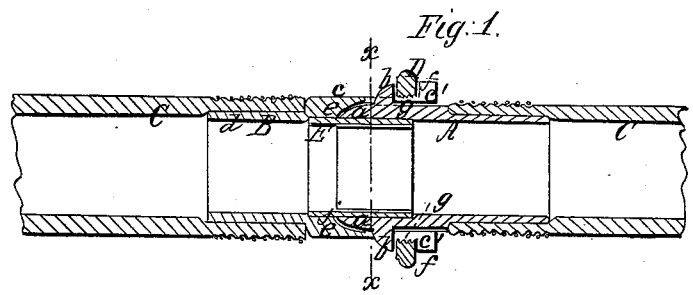
Figure 2:
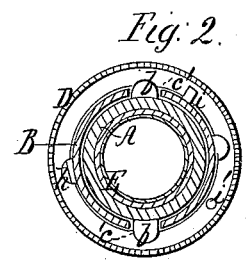
Figure 4:
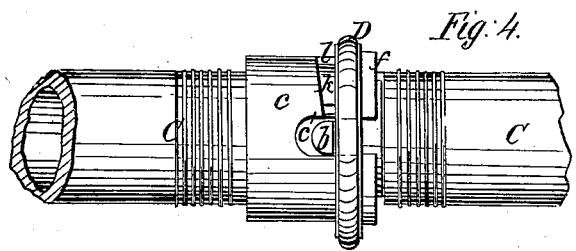
Figure 3:
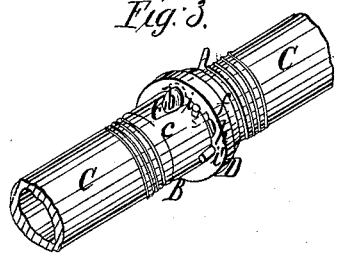
Figure 3:
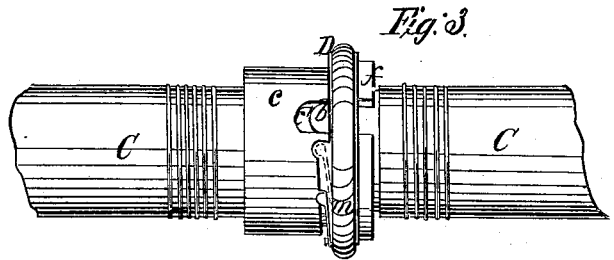

Figure 1, is a longitudinal central section of my improvement. Fig. 2, is a transverse section of the same, taken in the line $x, x,$ of Fig. 1. Fig. 3, is an external view of the same. Figs. 4 and 5, are external views, showing modifications of my improvement.

Similar letters of reference indicate corresponding parts in the several figures.

This invention consists in the employment or use of an elastic tube or ring placed within the coupling and so arranged in relation with the parts thereof, that the pressure of the water within the hose, will keep the coupling watertight.

To enable those skilled in the art to fully understand and construct my invention, I will proceed to describe it.

A, B, represents the two heads of the coupling. These heads are constructed of metal as usual and are attached to the ends of the hose C, in the ordinary manner. The head A may be termed the male head; it is of course tubular, and the external surface at its outer end is rounded as shown at ($a$) in Fig. 1. On the head A, near its outer end, two lugs or projections ($b, b,$) are formed at opposite points on its surface; the front and outer surfaces of said lugs or projections also being rounded.

The female head B has its outer part ($c$) of larger diameter than its inner part ($d$), the latter being of the same diameter as the inner part of the head A. The outer part ($c$) of the head B forms a socket to receive the outer part of A, and the inner end or part of the interior of the part ($c$) is rounded as shown at ($e$) to correspond inversely to the outer end of A, see Fig. 1. The socket ($c$) is slotted longitudinally at opposite parts, as shown at ($c', c'$) to receive the lugs or projections ($b, b$) of the head A.

On the outer end of the socket ($c$), a flanch ($f$) is formed, said flanch projecting from the socket ($c$) at right angles. This flanch extends all around the socket with the exception of the opening or breaks formed by the slots ($c'$). On the socket ($c$) a ring D is fitted or placed. This ring has a screw thread formed on its inner surface, and this thread fits in a corresponding thread formed on the socket ($c$), as shown at ($g$) in Fig. 1. The ring D has two notches or recesses ($h, h$) cut in its inner edge at opposite points, and a pin ($i$) is attached to socket ($c$) and another pin ($i^1$) is also attached to the ring D, said pin ($i^1$) projecting from one side of the ring.

E, represents a tube constructed of india-rubber or other material having a certain degree of elasticity. This tube is attached to the inner surface of the head A, and projects sufficiently far beyond the head A, as to cover the joint or junction ($j$) of the ends of the two heads when the same are coupled together, see Fig. 1.

The two heads A, B, are connected together as follows: The ring D on the socket ($c$) is turned until its notches ($h, h,$) are brought in line with the slots ($c'$). The head A is then inserted within the socket ($c$), the lugs or projections ($b, b$) on said heading passing through the notches ($h, h,$) and into the slots ($c'$) ($c'$). The ring D is then turned so that its notches ($h, h$) will be thrown out of line with the slots ($c'$) ($c'$), and the ring D will retain the head A, in the socket ($c$) of the head B, the rounded end ($a$) of the head A, fitting in the rounded end ($e$) of the socket ($c$). The ring D is prevented from moving casually in consequence of being screwed up snugly against the flanch ($f$), when it is turned to throw its notches ($h$) out of line with the slots ($c'$). The pins ($i, i$) serve the office of stops.

The elastic tube E, keeps the coupling water-tight, as the pressure of the water within effectually closes the joint ($j$) by pressing tube E against it.

I would remark that various means may be employed to prevent the ring D from casually turning; for instance, in Fig. 4, inclined projections K, attached to the ring, are fitted in corresponding recesses ($l$) in the surface of the socket, for the purpose of pressing the ring D against the flanch ($f$). A spring catch ($m$) may also be employed if desired; see Fig. 5.

By this improvement, a perfectly watertight coupling is formed by a very simple and economical arrangement that is not liable to get out of repair, and one that can be readily connected and disconnected.

Having thus described my invention, what I claim as new, and desire to secure by Letters Patent, is:—

The arrangement and combination of an elastic tube E, with the heads of the coupling A, B, so as to cover the joint $j$, and allow the same to be kept tight by the pressure of the liquid, substantially as herein shown and described.

CHS. VANDER WOERD.

Witnesses:
EZRA RIPLEY,
WM. M. GOODRIDGE.